Patented Apr. 2, 1940

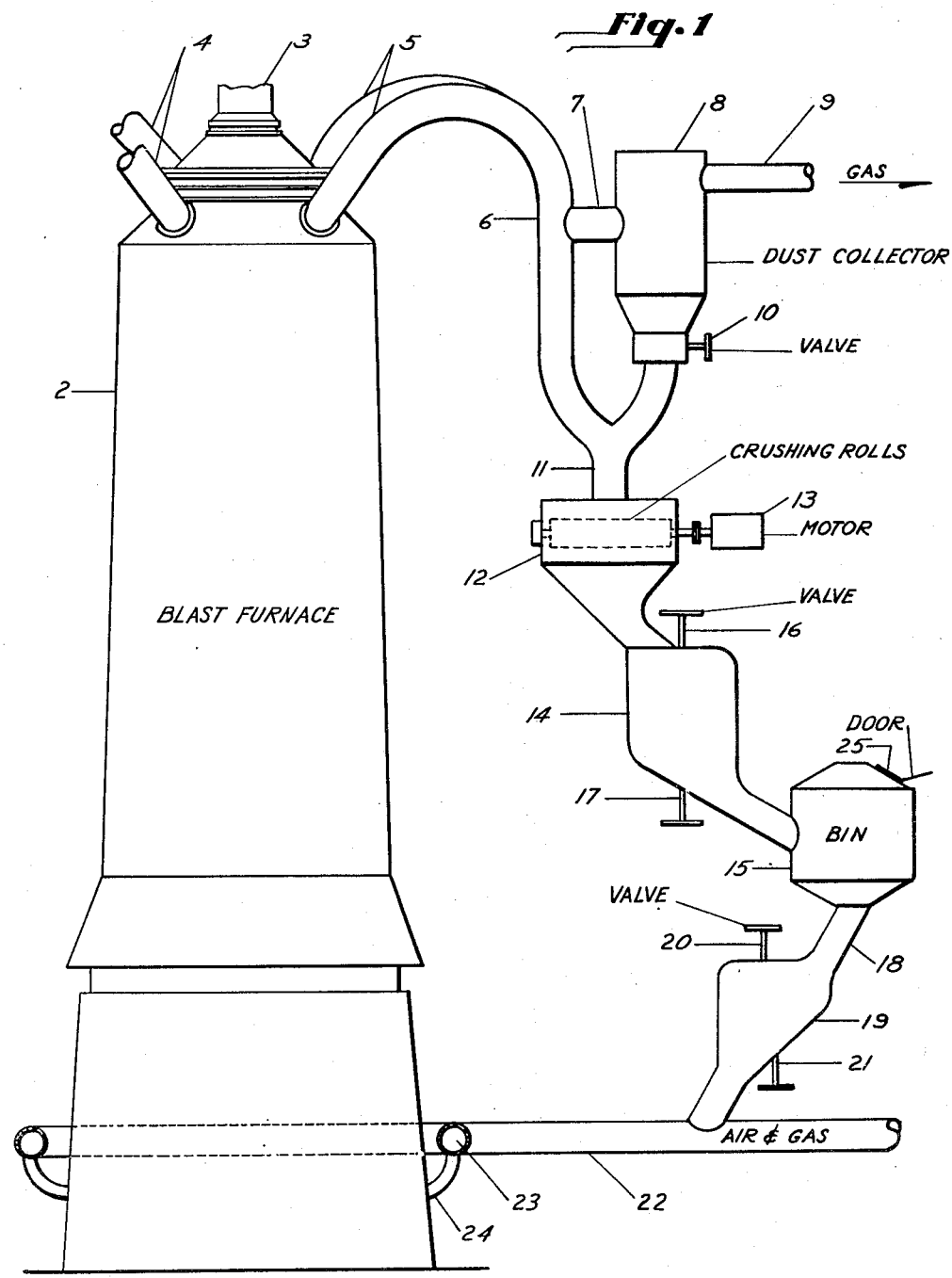

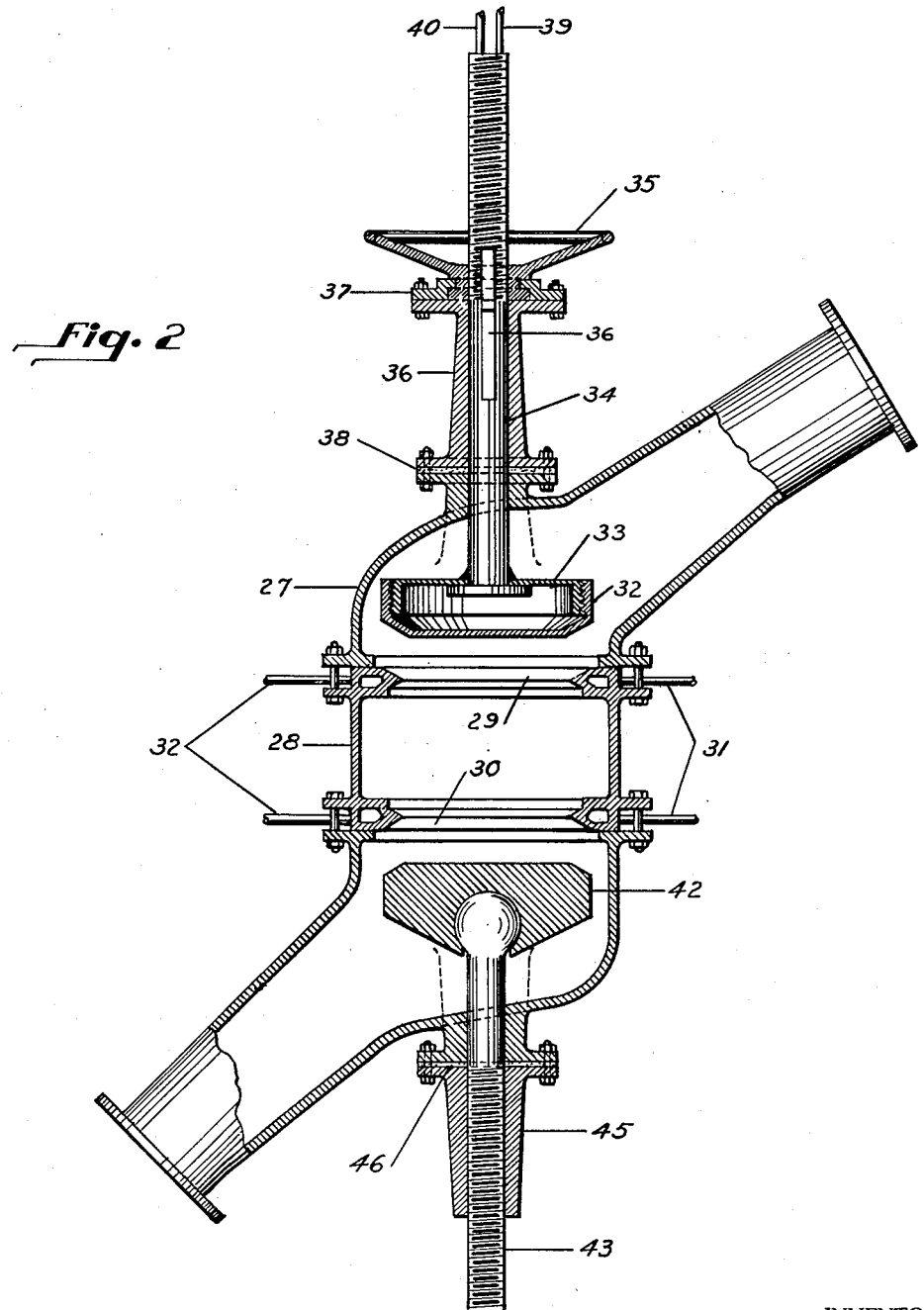

2,195,866

UNITED STATES PATENT OFFICE 2,195,866

BLAST FURNACE

Mike Le Clarick, Pittsburgh, Pa.

Application July 26, 1939, Serial No. 286,561

8 Claims. (Cl. 266—25)

My invention relates to the blast furnace art, and more particularly to a method and means of collecting the ore dust, coke particles and small lumps of limestone that are blown from the top of the furnace during melting operations.

Considerable difficulty has been experienced in collecting and disposing of the ore dust and lumps of coke etc., which are blown from the upper end of the furnace, and the expense of handling these ejected materials and finally disposing of them as by sintering the ore dust and recharging it to the furnace, has been an important factor.

An object of my invention is to provide an improved means and a method of collecting the dust and lumps of material that are blown from the furnace, and to return them to the furnace in a simple and effective manner.

Another object of my invention is to provide means whereby the major portion of the dust may be collected separately from the lumpy material, and whereby the coke and other lump material may be crushed and returned to the furnace either separately or along with the ore dust.

Still another object is to provide means for feeding small supplemental quantities of material into the furnace, at its lower end.

In the accompanying drawings, Figure 1 is a view in somewhat schematic form showing the arrangement of parts that constitute the apparatus for practicing my invention, and Fig. 2 is a sectional view, on an enlarged scale, of certain of the valve structures of Fig. 2.

A blast furnace of conventional type is indicated by the numeral 2. The material for charging the blast furnace, such as ores, coke, limestone etc. is introduced thorugh the usual charging opening 3. I provide pairs of pipes 4 and 5 in lieu of (or which may be connected to) the usual uptakes at the top of a blast furnace. The pipes 5 connect with and discharge into a conduit or pipe 6, from which a pipe 7 leads into a dust collector 8. The dust-laden gas will flow into the dust collector 8 which is provided with baffle plates or other suitable means for collecting the dust, the gas then flowing off through a pipe 9 for further cleansing and use as a fuel. A valve 10 controls discharge from the dust collector and may be left continuously open or opened only periodically to effect the discharge of dust which has been collected in the chamber 8.

Lumps of material such as coke and small pieces of limestone will, for the most part, fall through the pipe 6 and through a pipe 11 into a crushing mill 12 which is provided with suitable crushing rollers that are driven by an electric motor 13 or other source of power. The crushed material, as well as the dust from the collector 8, will flow through a valve chamber 14 into a bin 15. This chamber is provided with valves having operating stems 16 and 17. A discharge spout 18 leads from the lower side of the bin 15 to a valve chamber 19. Valves having operating stems 20 and 21 are located within the chamber 19. The valves in the chambers 14 and 19 may be of any suitable type, such as the forms shown in Fig. 2.

During filling of the bin, the valves in chamber 19 are completely closed, so that the blast pressure in the blast feed conduit 22 will not blow upwardly through the system just described. The fuel blast is discharged through a header 23 and nozzles or tuyères 24 into the lower end of the furnace, in the usual manner.

After a quantity of ore dust or crushed material, or both, has been collected in the bin 15, the valves in the valve chamber 14 are closed and the valves in the chamber 19 are opened; thereupon the material will flow from the bin into the fuel line 22 and be carried into the furnace. When the bin has been emptied, the valves in the chamber 19 will be closed, and the valves in the chamber 14 opened to permit the bin 15 to be again filled. The valves in the chamber 14 are provided in order to prevent flow of gas pressure upwardly through the system while the bin is being emptied.

Ordinarily one valve would probably suffice for each of the chambers 14 and 19, but I provide two valves as an element of safety, so that if one of the valves cannot be completely closed, the other valve will suffice to prevent upflow of pressure from the blast pipe 22.

Discharge from the pipes 4, which are duplicates of the pipes 5, will be to a dust collector and a crushing mill, and the dust and crushed materials will be conducted to the air and gas blast pipe in the same manner as from the pipes 5.

It will be understood that the solid materials from the pipes 4 and 5 can be delivered through systems such as that described to supplementary blast feed pipes, instead of the fuel blast pipe 22, and carried by said supplementary pipes into the lower end of the furnace.

In some instances it may be found desirable to augment the main charge of coke and limestone in the blast furnace, in which event additional quantities of solid materials may be introduced into the furnace by placing them directly in the bin 15 through a bin door 26 and opening the valves in the chamber 19, so that the materials will flow into the line 22 and be thereby carried into the furnace.

It will be understood that if it is not desired to feed the dust from the collector 8 into the furnace along with the crushed coke, the valve 10 will normally be kept closed, and the accumulations of ore dust will be fed therefrom only periodically instead of continuously. Also, if desired, the dust can be removed from the collector 8 without feeding it through the bin 15 and into the furnace.

In Fig. 2 I have shown forms of valves which may be employed in both the valve chambers 14 and 19. The valves are contained within a casing 27 that corresponds to either the casing 14 or the casing 19. The casing has an intermediate section 28 that carries valve seats 29 and 30 which are cored or hollow, so that cooling water may be circulated therethrough by pipes 31 and 32. If a considerable quantity of separated materials are being fed through the system at a fairly rapid rate, there will be considerable heat present and the water-cooling of the valve seats and the valves will prevent warping thereof.

The upper valve has a hollow seating portion 32 and a chambered body portion 33 that is welded to a valve stem 34, which is threaded at its upper end for engagement with the hub of a hand wheel 35. The hand wheel is held in place upon the stem casing 36 by a split collar 37 that is bolted to a flange formed integrally with the upper end of the casing 36. The stem 34 is held against rotation by a key 36, so that when the hand wheel 35 is rotated, the valve 32 can be raised and lowered. A packing ring 38 is provided to prevent leakage of gas upwardly along the valve stem. Pipes 39 and 40 communicate with the chamber formed by the members 32 and 33 and serve as a means for circulating water through said chamber.

A lower valve 42 has connection with a stem 43 that carries a hand wheel 44, the stem also having threaded connection with a sleeve 45, so that movement of the valve 42 to and from its seat 30 can be effected through rotation of the hand wheel 44. A packing ring 46 prevents leakage of gas along the valve stem 43.

I claim as my invention:

1. The combination with a blast furnace having a gas discharge pipe and a blast feed pipe, of a downwardly-directed conduit for receiving materials from said discharge pipe, a pipe leading from the side of said conduit to conduct a flow of gas therefrom, a dust collector for receiving the gas from said pipe and provided with a gas outlet pipe, a chamber positioned to receive lumps of material from said conduit and dust from said collector, a crusher in said chamber, a valve chamber positioned to receive the material from the last-named chamber, a valve for controlling the flow of said material, a bin for receiving the material from the valve chamber, a conduit leading from the bin to the blast feed pipe, and a valve for controlling flow through the last-named conduit.

2. The combination with a blast furnace having a gas discharge pipe and a blast feed pipe, of a downwardly-directed conduit for receiving materials from said discharge pipe, a pipe leading from the side of said conduit to conduct a flow of gas therefrom, a dust collector for receiving the gas from said pipe and provided with a gas outlet pipe, a chamber positioned to receive lumps of material from said conduit and dust from said collector, a valve for controlling flow of dust from the collector, a crusher in said chamber, a valve chamber positioned to receive the material from the last-named chamber, a valve for controlling the flow of material through the valve chamber, a bin for receiving the material from the valve chamber, a conduit leading from the bin to the blast feed pipe, and a valve for controlling flow through the last-named conduit.

3. The combination with a blast furnace having a gas discharge pipe, of a downwardly-directed conduit having connection with the said pipe, a pipe leading laterally from said conduit, for conveying gas therefrom, a dust collector into which the last-named pipe discharges, a pipe for conducting gas from the dust collector, means for receiving materials of lump form which pass downwardly through said conduit and the dust from said collector, and means for feeding the lumps into the furnace.

4. The combination with a blast furnace having a gas discharge pipe, of a downwardly-directed conduit having connection with the said pipe, a pipe leading laterally from said conduit, for conveying gas therefrom, a dust collector into which the last-named pipe discharges, a pipe for conducting gas from the dust collector, means for receiving material of lump form which pass downwardly through said conduit and the dust from said collector, means for crushing the lumps, and means for discharging the said material and dust into the furnace.

5. The method which comprises directing the gas discharge from a blast furnace, into a downwardly-directed conduit having a lateral opening through which the lighter materials will flow, the lower end of the conduit being normally closed, crushing the lumps of material which move down through the conduit, and feeding the crushed materials into the furnace.

6. The method which comprises directing the gas discharge from a blast furnace into a downwardly-directed conduit having a lateral opening through which the dust will flow and be thereby separated from the lump material, the lower end of the conduit being normally closed, collecting the dust which flows through said lateral opening, periodically feeding the dust into the furnace, and feeding the lump material into the furnace during periods when the dust is not being fed thereto.

7. The combination with a blast furnace having a gas discharge opening, of a downwardly-directed conduit having connection with the said opening, a crushing mill disposed beneath the said conduit in position to receive lumps of material, a pipe leading laterally from said conduit for conveying dust-laden gas therefrom, a dust collector into which the last-named pipe discharges, a pipe for conducting gas from the dust collector, a valve-controlled discharge outlet leading downwardly from the dust collector, a gravity discharge pipe extending downwardly from the crushing mill, and a blast pipe having communication with the said discharge outlet and the gravity discharge pipe, for receiving the materials therefrom and discharging them into the lower portion of the furnace.

8. The combination with a blast furnace having a gas discharge opening, of a downwardly-directed conduit having connection with the said opening, a crushing mill disposed beneath the said conduit in position to receive lumps of material, a pipe leading laterally from said conduit for conveying gas therefrom, a dust collector into which the last-named pipe discharges, a pipe for conducting gas from the dust collector, a valve-controlled discharge outlet leading downwardly from the dust collector, a gravity discharge pipe extending downwardly from the crushing mill, a valve controlling flow through said pipe, a bin positioned to receive the materials from said discharge outlet and the last-named pipe, a blast pipe disposed below the bin and discharging into the lower portion of the furnace, and a valve-controlled conduit leading from the bin to the blast pipe.

MIKE LE CLARICK.